UNITED STATES PATENT OFFICE.

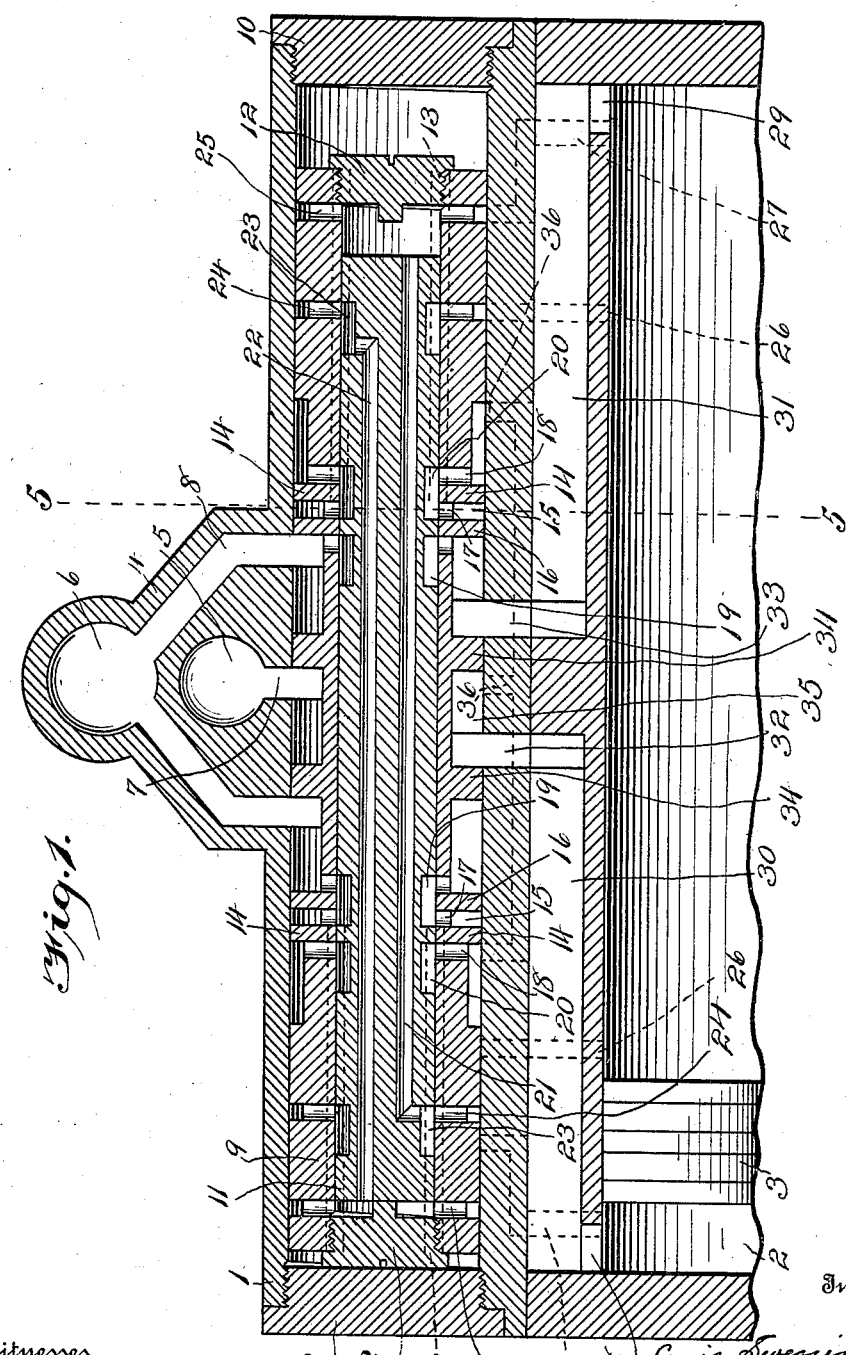

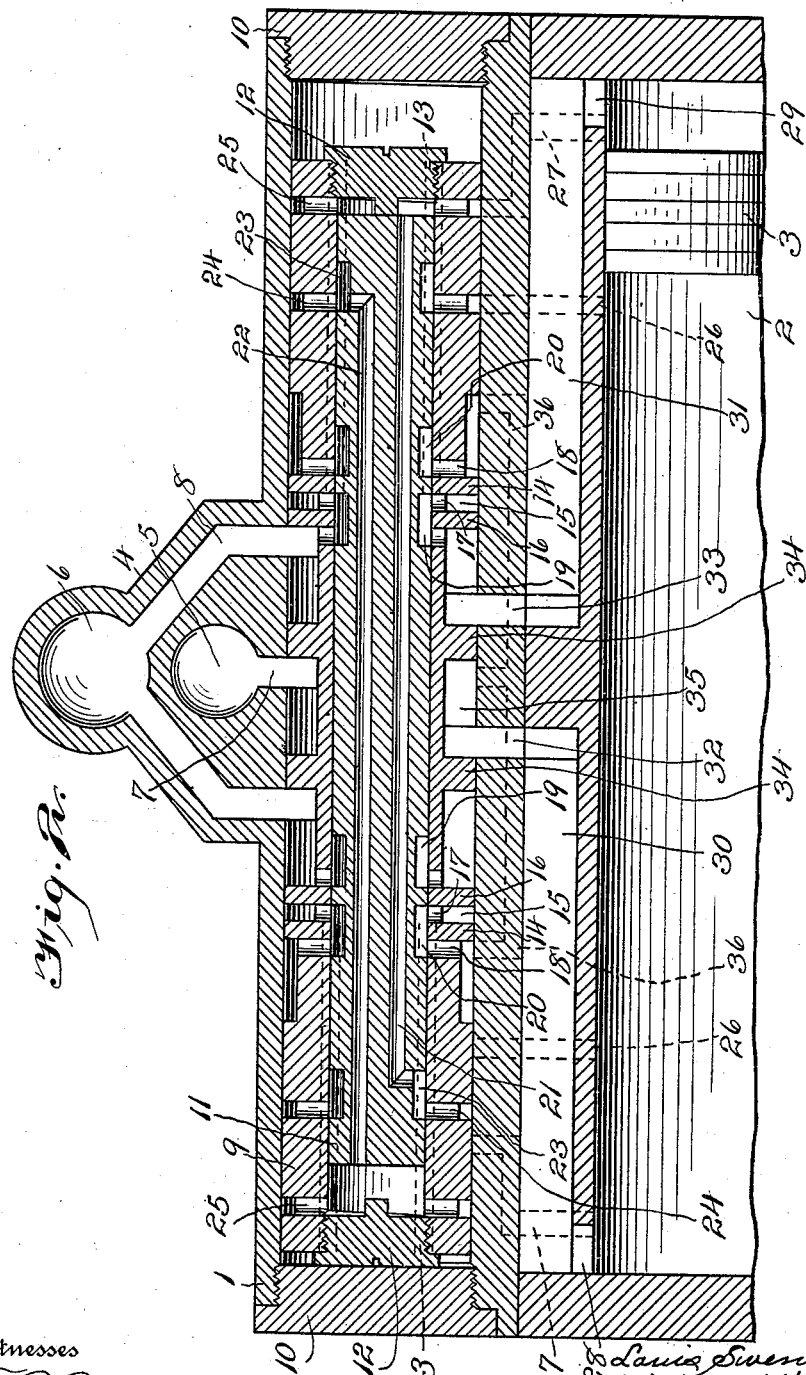

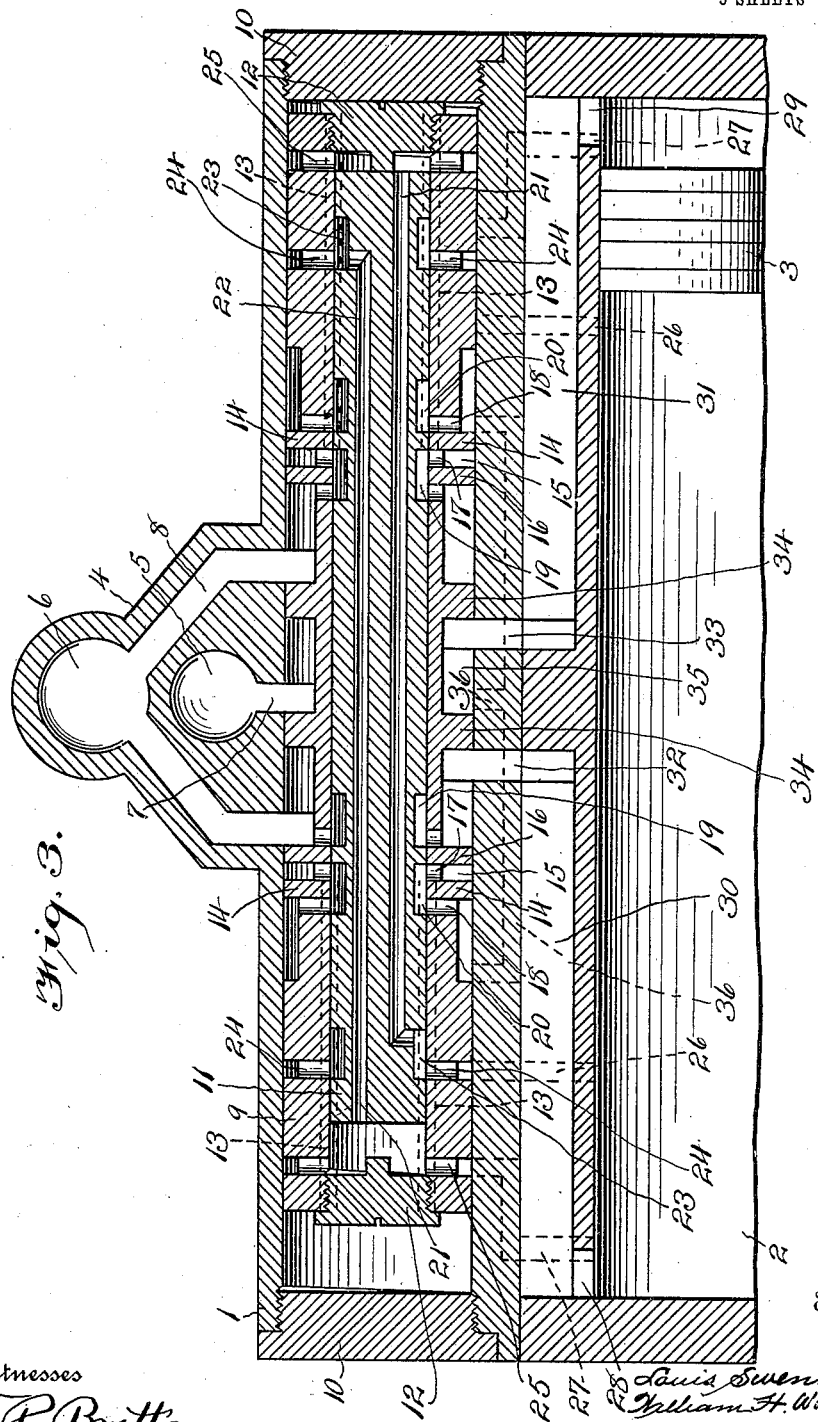

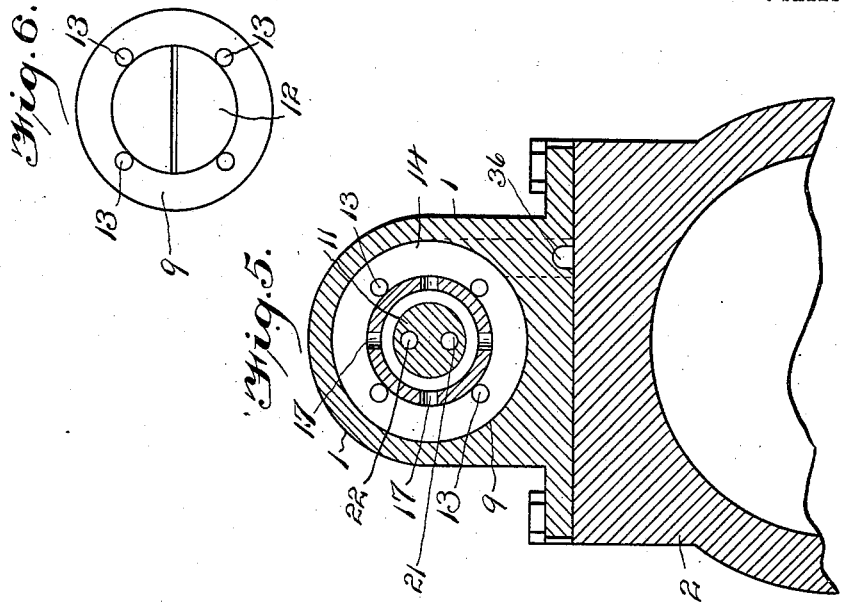
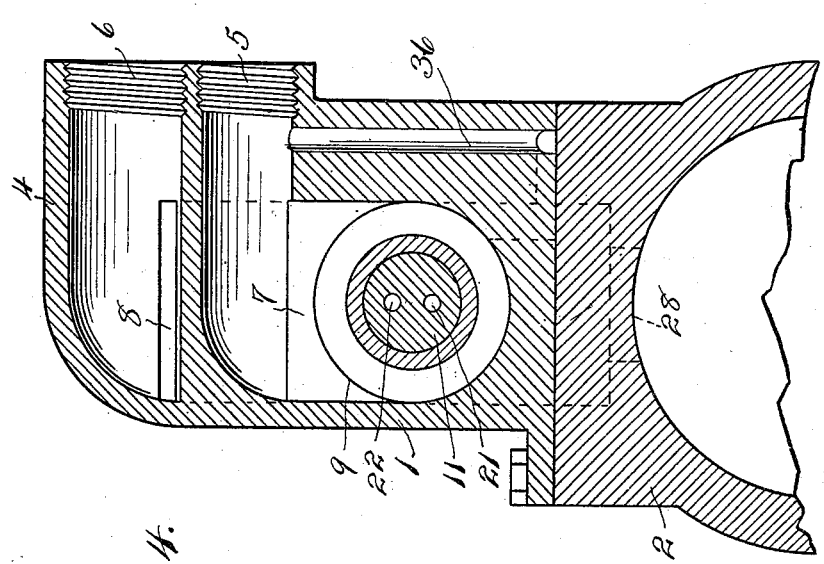

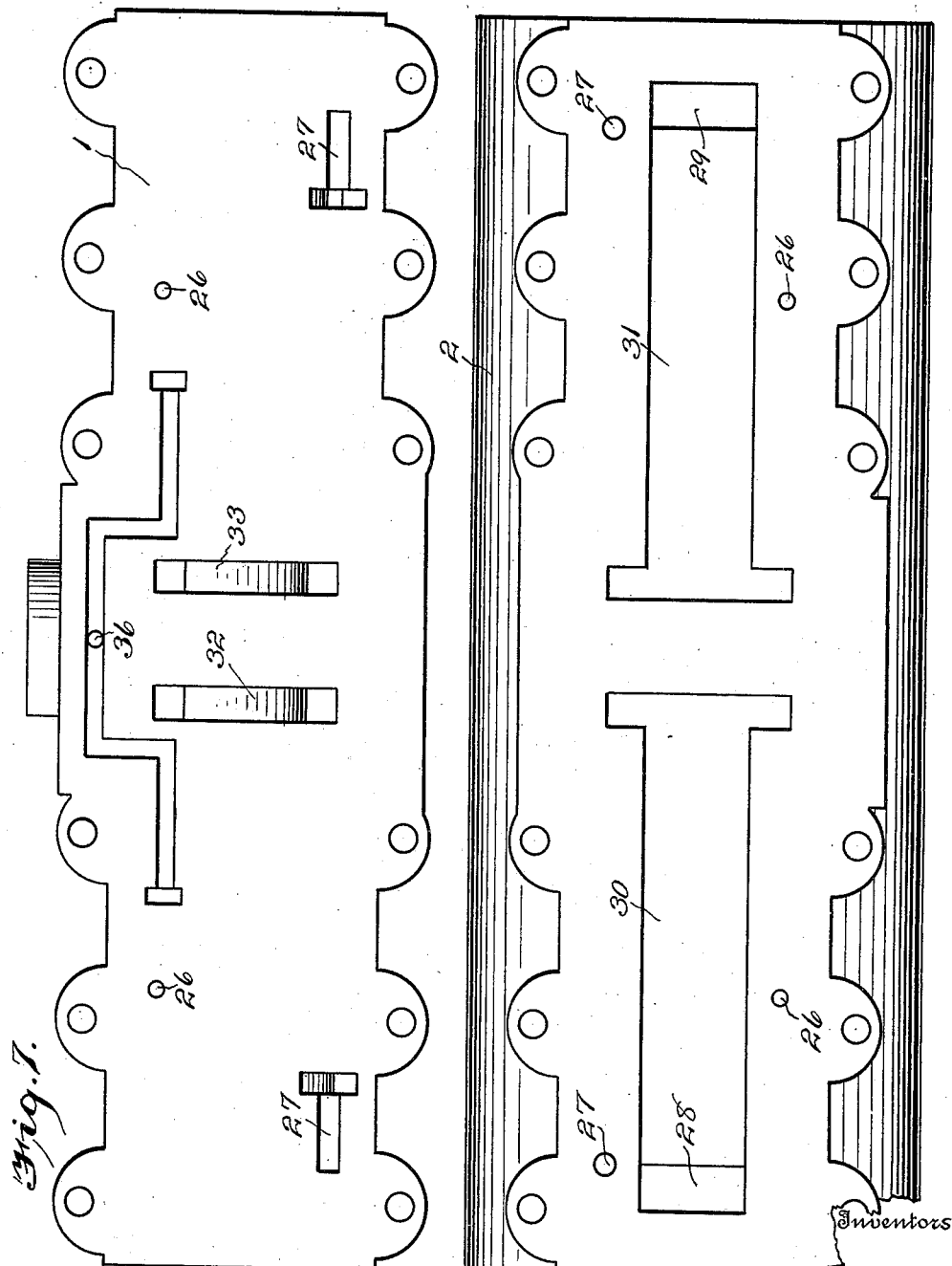

LOUIS SWENINGSON AND WILLIAM H. WOODWARD, OF SALEM, OHIO.

VALVE.

1,041,697.  Specification of Letters Patent.  Patented Oct. 15, 1912.

Application filed August 24, 1911. Serial No. 645,759.

*To all whom it may concern:*

Be it known that we, LOUIS SWENINGSON and WILLIAM H. WOODWARD, citizens of the United States, residing at Salem, in the county of Columbiana and State of Ohio, have invented certain new and useful Improvements in Valves; and we do declare the following to be a full, clear, and exact description of the invention, such as will enable others skilled in the art to which it appertains to make and use the same, reference being had to the accompanying drawings, and to the letters and figures of reference marked thereon, which form a part of this specification.

Our invention relates to improvements in valves.

It has for its object to provide a valve which may be used for water, air, steam or other fluid and for use in connection with any contrivance or device wherein a valve of this type may be available; and which valve is simple, containing few parts, is devoid of all springs; does not require the aid of any mechanical starting means to assist its operation, nor need any attention when in action.

A further object of this invention is to provide means for preventing short stroking of the piston and thus obviate and overcome a very serious difficulty which is sometimes encountered in devices of this character.

It has for a further object to carry out these ends in a simple, inexpensive and effective manner.

The invention further consists in the arrangement and construction of the ports which hold the valve in its proper relative position until the piston has completed its effective stroke.

The invention further consists in certain other novel details of construction and in combinations of parts, all of which will be first fully described and afterward specifically pointed out in the appended claims.

In the accompanying drawings illustrating the preferred embodiment of our invention wherein it will be understood that various changes and modifications may be made, as to the details of the construction and arrangement of the parts without departing from the spirit of the invention; Figure 1 is a broken sectional elevation of the invention with the various parts in initial position. Fig. 2 is a like sectional view thereof, the piston of the steam or pressure cylinder being at the extreme end of its stroke and one of a plurality of piston-valves thereof being in its final position. Fig. 3 is also a like sectional view thereof, the cylinder piston being still at the end of its stroke, both of the piston-valves, however, being shown in their final positions. Fig. 4 is a broken vertical sectional view taken centrally through the valve. Fig. 5 is also a broken vertical sectional view produced on the line 5—5 of Fig. 1. Fig. 6 is an end or face view of the larger piston-valve, and Figs. 7 and 8 are plan views of the valve-casing and the piston-cylinder, respectively.

In carrying out our invention, we suitably house the operative parts of the valve in a suitable casing or casting 1 and superpose or mount and secure the same upon a cylinder or casting 2 containing a piston 3, which cylinder may be adapted to be secured in position in any suitable way upon the device in connection with which the valve may be used, said valve casing being cast with a central extension 4 for providing an inlet-port 5 and an exhaust port 6 having passages 7 and 8, respectively, communicating with the interior of the valve-casing.

Within the casing 1 is arranged a hollow or tubular piston-valve 9 being introduced thereinto through the open ends of the casing, the openings thereof being suitably closed by screw-threaded plugs 10, and within said hollow piston-valve is contained a smaller piston-valve 11, the piston-valve 9 having open ends for the insertion of piston-valve 11, the openings thereof being closed by suitable screw-threaded plugs 12.

The piston-valve 9 has two series of longitudinal ducts or passages 13 extending from the ends thereof to and through annular partitions or rings 14 respectively, fixed to or cast with the piston-valve 9 at opposite sides of and short distances from the inlet-port and exhaust port passages 7 and 8, respectively, said series of passages being shown in dotted lines in each of Figs. 1, 2 and 3. These series of passages open at their inner ends into annular passages or ports 15 formed between the rings or partitions 14 and additional partitions 16 formed with the same piston valve. Also additional ports or passages 17 and 18 are formed or provided in the piston-valve 9 upon opposite sides of the partitions 14 and intermediate of said partitions and the partitions 16, while in the inner piston-valve 11 and in the piston valve 9 are superficial ports or recesses 19 and 20, respectively, arranged for coöperation with the ports 13, 17 and 18, as presently disclosed. In the piston valve 11 are also two longitudinal or axial ports or passages 21 and 22, one end of each opening through an opposite end of said piston-valve while the other ends of said passages or ports open laterally through diametrically opposite sides of said piston-valve into annular recesses or ports 23 arranged in and opening through said piston-valve, which recesses communicate with circular passages or ports 24 arranged in and opening through the piston-valve 9. Also arranged in and opening through the piston-valve 9 are additional similar ports 25, these ports communicating with the interior of said piston-valve and with the ports 24 and 25 communicate passages or ducts 26 and 27, respectively, disclosed in Figs. 1, 2 and 3 by dotted lines, which passages lead to the piston-cylinder 2, said cylinder having the usual ports 28 and 29 at its ends, which serve to alternately supply and exhaust according to the direction of the stroke of the piston with respect thereto. These ports 28 and 29 communicate with pressure or steam passages 30 and 31, respectively, intermediate the valve-casing and piston-cylinder, said passages having communication at their inner ends with additional passages 32 and 33, respectively, in turn communicating with the supply or inlet and exhaust-port passages 7 and 8.

The piston-valve 9 has upon its exterior suitably spaced-apart rings or shoulders 34 arranged about centrally thereof to form an annular port 35 to receive the steam or other pressure supply for its delivery into either of the passages 32 or 33 as in supplying such pressure to the piston-cylinder, as is thought is apparent. Still further ports or passages 36 leading or branching off from and communicating with the supply port 35 communicate by way of the passages 17 and 18 with the ports 15, and with these latter ports communicate as before stated the passages or ports 13 of the piston-valve 9.

As will appear from the drawings the ports 27 at each end of the cylinder 2 are larger than the ports 26. When, however, the piston is in position shown in Fig. 1 and the valves are in the position so illustrated the piston 3 on its return stroke causes the cylinder 2 to exhaust a portion of its contents into the port 27 at the extreme right end of the cylinder 2 and also a portion of its contents into port 26 which is closer to the center of the cylinder. The exhaust entering port 27 from the cylinder 2 passes up as indicated in dotted lines in Fig. 1 and enters the main valve 9 thus acting on the contiguous end or head of the auxiliary valve 11, while the exhaust entering port 26 passes up as indicated in dotted lines in Fig. 1 and enters the annular port or recess 23 in the auxiliary valve 11, which annular port or recess 23 communicates with the opposite end of the auxiliary valve 11 by means of the longitudinal port or passage 22 in the auxiliary valve 11; thus the pressure entering the port 26 in the cylinder 2 is led to the opposite end of the auxiliary valve 11 and acts against the left end or head of the said auxiliary valve 11 as will be clearly apparent from Fig. 1. In order to insure a proper effective stroke of the cylinder 2 it is essential that the auxiliary valve 11 be maintained in the position illustrated in Fig. 1 until the end of the effective stroke. Should the auxiliary valve 11 move into position illustrated in Fig. 2 before the piston 3 has completed its effective stroke, said piston 3 would be quickly returned and a short stroke of the piston would result. In order therefore to prevent this short stroking and to absolutely maintain the auxiliary valve 11 in position shown in Fig. 1 the ports 27 leading from the cylinder 2 are larger than the ports 26 as is clearly apparent from an inspection of Fig. 1; consequently a greater pressure is exerted against the right end or head of the auxiliary valve 11 by reason of the enlarged size of the port 27 than is exerted against the left end or head of the auxiliary valve 11. Furthermore it will be observed that as the passage of the fluid through port 26 is considerably longer than the passage of the fluid through port 27 it will be understood that the pressure acts more quickly and with greater effect upon the right end of the auxiliary valve 11 than upon the left end thereof; consequently during the travel of the piston from the left end of the cylinder 2 to the right end it gets a proper and constant pressure for the reason that the auxiliary valve 11 is maintained in the position illustrated in Fig. 1 until the piston 3 completes its effective stroke. However as soon as the piston reaches the position shown in Fig. 2 which is the end of its effective stroke and passes the port 26 pressure in the cylinder 2 on the pressure side of the piston 3 enters the smaller port 26 and is led to the left end or head of the auxiliary valve 11 through the longitudinal port or passage 22 and as this pressure from the pressure side of the piston exceeds the pressure from the exhaust side the auxiliary valve 11 moves into position shown in Fig. 2. As this movement of the auxiliary valve 11, as shown in Fig. 2, carries the annular port 20 on the right hand portion of the auxiliary valve 11 into communication with the ports 17 and 18 in the main valve 9, which port 18 is in communication with the fluid pressure by means of the port 32 illustrated in dotted lines in Fig. 2, said pressure is communicated to the longitudinal ports 13 in the main valve 9 shown in dotted lines in Fig. 2 which causes the said pressure to be exerted against the left end or head of the main valve 9, thus moving the main valve 9 into position illustrated in Fig. 3.

The operation of this invention, it is thought, is made clearly apparent from the foregoing description, as it will be seen that with admission of steam or other pressure supply through the port 5 the ports being in the position indicated in Fig. 1 such steam or pressure supply will be delivered through the intermediate ports and passages to the piston 3 driving it toward the opposite end of its cylinder, thus imparting to said piston its initial effective stroke. In the interim or as the piston passes the port 26 the pressure will be delivered through said port and its connections into and through the upper passage 22 of the piston-valve 11, which pressure will be received upon the inner surface of the opposite head of the outer piston-valve 9 and react to move the piston-valve 11 in the opposite direction or to the position indicated in Fig. 2. With this movement of parts the left hand port 15 of the piston-valve 9 will be put into communication with the corresponding passages 13 when the pressure will be delivered therethrough and against the initial or left hand head of said piston-valve and by reaction move the valve into the position indicated in Fig. 3, as it is thought will be readily appreciated. It will be also understood, and it is believed to be clearly apparent, that with this movement of the piston-valves the steam or pressure will be shunted or controlled so that the exhaust and receiving ends of the piston-cylinder will be automatically interchanged and the position or movement of the piston thus be likewise or automatically controlled; and from which the advantages and benefits of our invention as above given will be fully appreciated.

The operation of the valve in exhausting pressure from the cylinder 2 is as follows: As the piston 3 moves from the left end of the cylinder 2 toward the right end the contents of the cylinder 2 on this stroke is exhausted through the exhaust port 29 into the chamber 31, into the port 33 and into the annular port in the main valve 9 which communicates therewith and thence into the passage 8 in the valve casing and out through the exhaust passage 6 as will be clearly apparent from Fig. 1, it being of course understood that a portion of the exhaust from the cylinder 2 enters the ports 26 and 27 leading from the cylinder 2 in order to hold the auxiliary valve 11 in position shown in Fig. 1 as has been previously described. When, however, the auxiliary valve 11 moves from the position shown in Fig. 1 into position shown in Fig. 2 said auxiliary valve 11 exhausts directly into the cylinder 2 through the port 27 entering said cylinder as will be apparent from an inspection of the drawings. When, however, the auxiliary valve 11 has been moved into position shown in Fig. 2 the annular port 19 on the right portion of the auxiliary valve 11 moves into communication with the port 15 of the main valve 9 which causes the exhaust from the main valve 9 to pass through the longitudinal ports 13 therein shown in dotted lines in Fig. 2 and out through the port or passage 33 into the exhaust port or passage 8 in the valve casing.

The exhaust of the auxiliary valve 11 directly into the cylinder 2 is a material feature of this construction. It will be noted that the threaded plugs 12 in the ends of the main valve 9 are provided with a central boss or projection against which the auxiliary valve 11 impinges at the end of each stroke of said auxiliary valve 11, thus acting as a stop for the movement of the auxiliary valve 11 and allowing ample space to remain at all times between the end or head of the auxiliary valve 11 and the inner end of the main valve 9 so as to provide for a proper operation of the valve. It will also be noted that the said threaded plugs 12 are so constructed as to extend some distance beyond the ends of the main valve 9 so as always to maintain a space between the ends or heads of the main valve 9 and the threaded plugs 12 of the valve casing.

Having thus fully described the invention it is of course apparent that certain changes can be made in the arrangement and construction of the parts and we consider ourselves clearly entitled to all such changes and modifications as fall within the scope of the appended claims.

What we claim as new and desire to secure by Letters Patent of the United States, is:—

1. A device of the character described comprising a cylinder and piston, two ports communicating with the said cylinder at each end thereof to act as supply and exhaust ports, a plurality of ports independent from the supply and exhaust ports communicating with the cylinder, a valve casing associated with said cylinder, a cylindrical main valve within said valve casing, a cylindrical auxiliary valve within said cylindrical main valve, said cylindrical main valve and cylindrical auxiliary valve being provided with ports and passages communicating with the supply and exhaust ports of the cylinder and effecting communication between said supply and exhaust ports of the cylinder and supply and exhaust openings in the valve casing, ports in said main and auxiliary valves communicating with ports in said cylinder other than the supply and exhaust ports in order to cause the exhaust from the cylinder to act upon the auxiliary valve simultaneously at both ends thereof and to provide a greater pressure on one end of the auxiliary valve than on the other to hold the said auxiliary valve against movement, one of said last mentioned ports being arranged to take pressure from the cylinder to exert the same on one end of the auxiliary valve to move the same to lead pressure to one end of the main valve to move said main valve to effect communication between the intake and exhaust openings in the valve casing with the intake and exhaust ports of the cylinder, substantially as described and for the purposes set forth.

2. A device of the character described comprising a cylinder and a piston, suitable supply and exhaust ports in said cylinder, additional ports in said cylinder, a valve casing associated with said cylinder, a main slidable valve in said valve casing, an auxiliary slidable valve arranged in said main valve and slidable therein, said valve casing being provided with suitable supply and exhaust openings to lead the pressure supply to the said valve casing and to conduct the exhaust therefrom, said main valve being provided with annular ports to register with the supply and exhaust ports in the valve casing and to register with the supply and exhaust ports leading to the said cylinder, said main valve being provided with ports arranged to register with the ports in said cylinder other than the main supply and exhaust ports to cause a portion of the exhaust from said cylinder to pass into the main valve and to act upon the said auxiliary valve therein, means in said auxiliary valve to allow the exhaust pressure from the cylinder to act on both ends of the said auxiliary valve to hold the said auxiliary valve against movement during the effective stroke of the said piston, one of said last mentioned ports in the said main valve being arranged to receive pressure from the said cylinder to move the said auxiliary valve, said auxiliary valve being provided with ports adapted to register with ports in the said main valve to cause the pressure from the cylinder to act upon the said main valve to move the same at the completion of each effective stroke of the said piston, substantially as described and for the purposes set forth.

3. A device of the character described comprising a cylinder and a piston, said cylinder being provided with suitable supply and exhaust ports and also provided with a plurality of additional ports, a main slidable valve associated with said cylinder, an auxiliary valve arranged within said main valve and slidable therein, means for leading the supply pressure to the said main valve and for exhausting therefrom, said main valve being provided with ports to lead the pressure and exhaust to and from the said cylinder, said main valve being provided with ports to register with the said additional ports in the said cylinder to lead a portion of the exhaust therefrom to the said auxiliary valve with the said main valve, said auxiliary valve being provided with means for causing the exhaust pressure so led thereto to act on both ends of the said auxiliary valve to hold the said auxiliary valve against movement during the effective stroke, one of said additional ports in said cylinder being arranged to take pressure from the cylinder at the end of the effective stroke of the piston to lead pressure therefrom to one end of the said auxiliary valve to move the same within the said main valve, said auxiliary valve being provided with ports registering with ports in the said main valve to have a communication between the supply pressure and one end of the said main valve to lead said supply pressure thereto to move said main valve, substantially as described and for the purposes set forth.

4. A device of the character described comprising a cylinder and a piston, said cylinder being provided with suitable supply and exhaust ports, a main valve associated with said cylinder, an auxiliary valve arranged within said main valve and slidable therein, means for leading pressure and exhaust to and from said main valve, means for leading pressure and exhaust to and from said cylinder to said main valve, means for leading exhaust from said cylinder to said auxiliary valve to act at both ends thereof unequally in order to hold said auxiliary valve against movement during the effective stroke of the said piston, said means also acting to cause a communication between the supply pressure in said cylinder to one end of the said auxiliary valve when the said piston has reached the end of its effective stroke in order to move said auxiliary valve, said auxiliary valve and said main valve being provided with means to lead supply pressure to one end of said main valve to move said main valve, substantially as described and for the purposes set forth.

5. A device of the character described comprising a cylinder and piston, a main valve associated therewith, an auxiliary valve associated with said main valve, said device being provided with means for leading pressure to and exhausting from the said cylinder to actuate the said piston and provided with means for leading a portion of the exhaust from said cylinder to both ends of said auxiliary valve in such manner that pressure of the exhaust acts unequally upon the ends of said auxiliary valve to hold the said auxiliary valve against movement during the effective stroke of the said piston, said means also acting to cause a communication between the supply pressure in the cylinder and one end of the said auxiliary valve to move the said auxiliary valve, said auxiliary valve and said main valve being provided with means for leading the supply pressure to one end of the said main valve to move the same when the said piston has reached the end of its effective stroke, substantially as described.

6. A device of the character described comprising a cylinder and piston, a main valve associated therewith, an auxiliary valve associated with said main valve, means for leading a portion of the pressure from said cylinder to the ends of said auxiliary valve in such manner that the pressure on the ends of said auxiliary valve is unequal so as to hold the said auxiliary valve against movement during the effective stroke of the said piston, and means controlled by the movement of the said auxiliary valve to effect communication between the supply pressure and one end of the said main valve to move the said main valve when the said piston has reached the end of its effective stroke.

7. A device of the character described comprising a cylinder and piston, a main valve associated with said cylinder, an auxiliary valve arranged within said main valve and slidable therein, said main valve being provided with ports to lead pressure to and exhaust from the said cylinder, a threaded plug in each end of said main valve, each threaded plug being provided with a boss extending inwardly within the said main valve and in the path of movement of the said auxiliary valve, said boss being so arranged to limit the movement of the said auxiliary valve within the said main valve in such manner as to provide a chamber between the ends of the said auxiliary vlave and the inner surface of the said threaded plugs when the said auxiliary valve has reached the limit of its movement, a casing for the said main valve, said plugs extending beyond the ends of the said main valve to impinge against the said casing and to limit the movement of the said main valve, substantially as described and for the purposes set forth.

In testimony whereof, we affix our signatures, in presence of two witnesses.

LOUIS SWENINGSON.
WM. H. WOODWARD.

Witnesses:
R. C. KRIDLER,
G. M. THOMAS.

Copies of this patent may be obtained for five cents each, by addressing the "Commissioner of Patents, Washington, D. C."